March 20, 1928.
L. JOHNSON
1,663,533
ROLLING MILL DRIVING SPINDLE
Filed Sept. 12, 1924
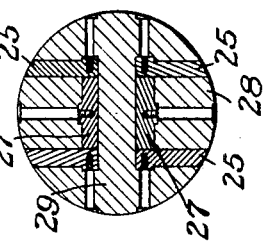
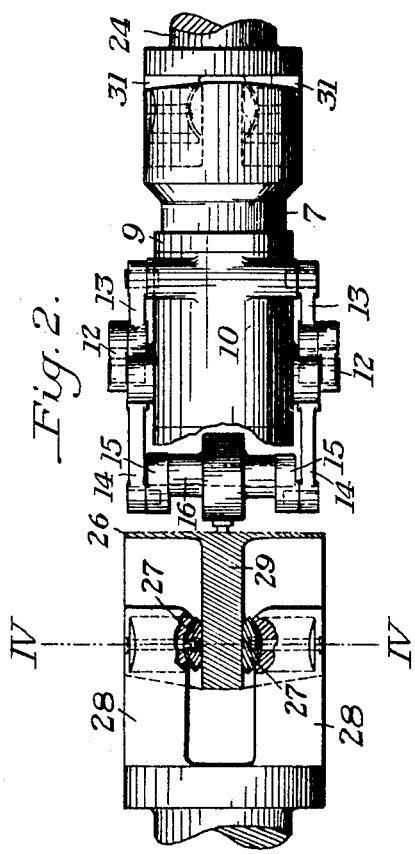
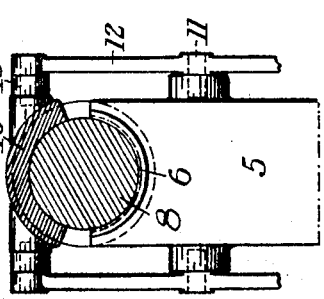
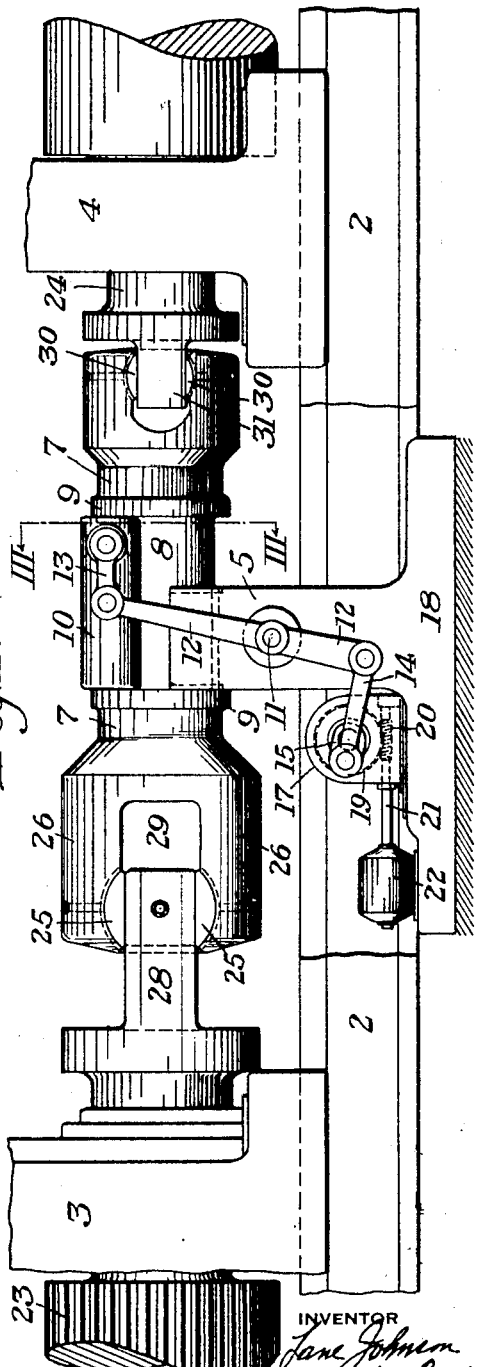
INVENTOR Patented Mar. 20, 1928.                                                           1,663,533

UNITED STATES PATENT OFFICE.

LANE JOHNSON, OF PITTSBURGH, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

ROLLING-MILL DRIVING SPINDLE.

Application filed September 12, 1924. Serial No. 737,277.

The present invention relates to rolling mill spindles and particularly to spindles having universal couplings to the pinions and roll necks, such as shown, for example, in my copending applications, Serial Nos. 737,276 and 737,278 the latter having issued as Patent 1,532,752, and the former as Patent 1,567,057, filed of even date herewith, and adapted to be shifted axially to uncouple them from the pinions.

The object of the present invention is to provide in combination with a spindle of this character a bearing for the spindle and means associated therewith for shifting the spindle in the bearing to either uncouple it from the roll neck or couple it to the same.

In the accompanying drawings, wherein I have illustrated a preferred embodiment of the invention:

Figure 1 is a view showing in elevation a spindle coupled to a roll neck and driving pinion and having a bearing and shifting means in accordance with the present invention associated therewith;

Figure 2 is a plan view partly broken away and partly in section of the construction shown in Figure 1;

Figure 3 is a transverse vertical section on the line III—III of Figure 1; and

Figure 4 is a transverse section on the line IV—IV of Figure 2.

Referring to Figure 1, the reference numeral 2 represents a part of the bed plates of a rolling mill having supported thereon housings 3 and 4 for the pinions and rolls. Arranged intermediate these housings is a standard 5 affording a stationary open bearing 6 for the spindle 7. The spindle 7 has a journal portion 8 intermediate its ends engaging the bearing 6, and has integral collars 9 at the opposite ends of the journal portion which limit axial movement of the spindle in the bearing.

Engaging the upper side of the journal portion 8 is a movable bearing member 10 having a length substantially equal to the length of the journal portion 8. Journaled on the standard 5 are rocker arms 12, the upper ends of which are connected by links 13 to the bearing member 10. The lower ends of the rocker arms 12 are connected by pitmen 14 to crank arms 15 on the opposite ends of a shaft 16. This shaft is journaled in bearings in a housing 17 supported on the base 18 of the pedestal 5, and carries a worm gear 19 engaged by a worm 20 on a worm shaft 21. The worm shaft 21 is driven by a motor 22 mounted on the base 18.

As previously stated, one end of the spindle 7 may be coupled to the driving pinion 23 by a universal coupling of the character disclosed in my copending application Serial No. 737,276, whereby the spindle may be shifted axially towards the pinion to uncouple its opposite end from the roll neck 24. This universal coupling comprises slippers 25, journaled in the arms 26 of the bifurcated spindle end, and slippers 27, journaled in the arms of the tongue 29 and slidably engaging the web 28 which connects the arms 26.

The universal coupling at the opposite end of the spindle may be of the character disclosed in my copending application Serial No. 727,278, now issued as Patent 1,532,752, above referred to. This coupling comprises slippers 30, journaled in the arms of the bifurcated end of the spindle and slidably engaging the bifurcated tongue 31 of the roll neck 24. A more detailed description of this coupling may be obtained by reference to my application referred to.

It will be apparent that with this construction with the spindle in the position illustrated in Figure 1, by operating the motor 22 in one direction, the bearing member 10 will be moved towards the pinion 23 and, by reason of its engagement with the collars 9, will shift the spindle 7 axially in the stationary bearing 6 to uncouple the spindle from the roll neck 24. Operation of the motor in the reverse direction will serve to shift the spindle in the opposite direction to couple it to the roll neck. The collars 9 limit the axial movements of the spindle, and the worm drive between the motor and the member 10 will serve to hold the spindle in either of its shifted positions.

It will be apparent that I have provided by the present invention not only a bearing for supporting the spindle, but also means whereby the spindle may be readily shifted axially to uncouple it from the roll or to couple it thereto.

While I have shown and described a preferred embodiment of the invention, it will be understood that the invention is not limited to this precise embodiment, but that it may be otherwise embodied within the scope of the appended claims.

I claim:

1. In a rolling mill, in combination with a pinion member and a roll member, a spindle coupled to said pinion and roll and adapted to be shifted axially to uncouple it from one of said members, said spindle having a bearing surface thereon, a fixed bearing for said spindle engaging the bearing surface and of less width than the bearing surface, and means for shifting said spindle axially in said bearing, substantially as described.

2. In a rolling mill, in combination with a pinion member and a roll member, a spindle coupled to said pinion and roll and adapted to be shifted axially to uncouple it from one of said members, a single fixed bearing for said spindle between the roll and pinion, and means for shifting said spindle axially in said bearing and for holding it in shifted position, substantially as described.

3. In a rolling mill, in combination with a pinion member and a roll member, a spindle coupled to said pinion and roll and adapted to be shifted axially to uncouple it from one of said members, a bearing for said spindle comprising a stationary part affording a support for the spindle and a movable part, and means for moving said movable part to shift said spindle axially in said stationary part, substantially as described.

4. In a rolling mill, in combination with a pinion member and a roll member, a spindle coupled to said piston and roll and adapted to be shifted axially to uncouple it from one of said members, said piston having a journal portion intermediate its ends and collars at the opposite ends of said journal portion, a stationary bearing engaging said journal portion, and means for shifting said spindle axially in said bearing, said collars limiting the movements of said spindle in opposite directions in said bearing, substantially as described.

5. In a rolling mill, in combination with a pinion member and a roll member, a spindle coupled to said pinion and roll and adopted to be shifted axially to uncouple it from one of said members, said pinion having a journal portion intermediate its ends and collars at the opposite ends of said journal portion, a stationary bearing engaging said journal portion, a movable bearing member located above the stationary bearing engaging said journal portion and engageable with said collars for shifting said spindle axially in said stationary bearing, and means for actuating said movable bearing member, substantially as described.

6. The combination with a rolling mill spindle having a coupling at each end thereof adapted to be shifted axially to uncouple it from a pinion or roll member, of a stationary bearing for said spindle, and shiftable means carried by levers mounted on said bearing and operatively engaging with said spindle for shifting said spindle axially in said bearing, substantially as described.

7. The combination with a rolling mill spindle adapted to be shifted axially to uncouple it from a pinion or roll member, of a standard affording a stationary bearing for said spindle, said spindle having a journal portion engaging said bearing and collars at opposite ends of said journal portion, a movable bearing member engaging said journal portion between said collars, rocker arms pivoted to opposite sides of said standard and operatively connected to said movable bearing member, a motor mounted on the base of said standard, and driving connections including a worm gear between said motor and said rocker arms for shifting said spindle axially in said stationary bearing member, substantially as described.

In testimony whereof I have hereunto set my hand.

LANE JOHNSON.